United States Patent
Buck

[15] 3,654,576
[45] Apr. 4, 1972

[54] RECIPROCAL PHASE SHIFTER EXHIBITING NEGATIVE PHASE SHIFT

[72] Inventor: Daniel C. Buck, Hanover, Md.
[73] Assignee: Westinghouse Electric Corporation, Pittsburgh, Pa.
[22] Filed: Mar. 25, 1969
[21] Appl. No.: 810,313

[52] U.S. Cl. ........................................333/31 A, 333/24.1
[51] Int. Cl. ..........................................H01p 1/18
[58] Field of Search...............................333/24.1, 31, 31 A

[56] References Cited

UNITED STATES PATENTS 3,471,809 10/1969 Parks et al. ........................333/24.1 X
3,205,501 9/1965 Kuhn ..................................333/24.1 X

OTHER PUBLICATIONS

Lax et al. Microwave Ferrites and Ferrimagnetics, McGraw-Hill, N.Y., 1962, Page 603 relied on Primary Examiner—Paul L. Gensler
Attorney—F. H. Henson and E. P. Klipfel

[57] ABSTRACT

A miniature electromagnetic wave apparatus or reciprocal phase shifter is disclosed. The apparatus comprises a wave guide structure having a longitudinal axis and at least first and second parallel elongated conductive members. The wave guide structure is dimensioned so as to support propagation of electromagnetic wave energy in a direction along the longitudinal axis of the wave guide structure. The electromagnetic wave energy as supported in said wave guide structure has longitudinally and transversely extending r.f. magnetic field components. A thin elongated body of gyromagnetic material is disposed between the conductive members so as to be traversed by the transversely extending magnetic field components. Means are associated with the wave guide structure for establishing a given state of magnetization within the body of gyromagnetic material and longitudinally thereof so as to effect negative phase shift of the wave energy propagated through the phase shifter.

6 Claims, 10 Drawing Figures

Fig. 3 LONGITUDINAL

INVENTOR.
DANIEL C. BUCK

INVENTOR.
DANIEL C. BUCK
BY.
ATTORNEY

RECIPROCAL PHASE SHIFTER EXHIBITING NEGATIVE PHASE SHIFT

BACKGROUND OF THE INVENTION

1. Field of the Invention

The present invention relates to reciprocal electromagnetic wave transmission apparatus and particularly, to miniature reciprocal wave guide apparatus for effecting reciprocal phase shift of microwave energy propagated through it.

More particularly, the invention relates to miniature microwave apparatus utilizing gyromagnetic ferrite materials to produce negative phase shift of the wave energy propagated through it.

2. Description of the Prior Art

The use of materials, such as ferrites, having gyromagnetic properties to obtain both reciprocal and non-reciprocal effects in microwave transmission circuits is widely known and widely used in various applications. Since it is the gyromagnetic properties of ferrites that are essential to the operation of this invention, hereafter ferrites will be used synonomously with gyromagnetic materials.

Although those skilled and working in the art are familiar with the fundamental mechanisms by which the action of gyromagnetic materials change the propagation characteristics of microwave devices it may be helpful for some readers to refer to U.S. Pat. No. 3,332,042, issued July 18, 1967, in which a brief outline and a cross-reference to a more complete treatise of the basic fundamentals of the behavior of gyromagnetic materials are set forth.

It may be explained that the longitudinally magnetized ferrite phase shifters are known, see, for example, U.S. Pat. No. 3,041,605. Such phase shifters comprise, in general, a section of rectangular wave guide on which a solenoid is wound to produce a longitudinal magnetic field through an element of ferrite material mounted centrally within the wave guide between the broad walls thereof.

When the magnetic field is established at different values, the permeability of the ferromagnetic material is changed and results in altered values of the propagation constant of the wave guide and thereby the phase of microwave energy as it is propagated therethrough. In such devices, which can be characterized as electrically "thick," the phase shift is positive, that is, the wave guide apparatus becomes electrically longer when the direct current magnetic field is applied.

In contrast to reciprocal wave guide phase shifters of the type just described, microstrip and strip line phase shifter devices exhibit negative phase shift characteristics.

Investigation has shown that this anomalous behavior can be explained in terms of axial propagation constants, in that, in the wave guide devices the propagation constant increases with applied magnetic field, whereas the propagation constant of the microstrip and strip line devices decreases with applied field. It was further determined during the course of investigation of quasi-TEM mode propagation in ferrite parallel plane guides, that advantage could be taken of this anomalous behavior to provide a very thin reduced height miniature reciprocal phase shifter having negative phase shift characteristics. It was determined that ferrites which were thin in the transverse plane compared to a quarter wavelength of the propagating wave in the unmagnetized dielectric medium exhibited maximum negative differential phase shift. Whereas, very thick ferrites show positive differential phase shift as in the prior art.

More particularly, it was discovered that the $TE_{10}$ mode in an electrically thin ferrite center loaded guide, having highly similar field patterns to that of the $TM_0$ mode in parallel plane guide, provided a practical phase shifter geometry of very simple design.

SUMMARY OF THE INVENTION

Accordingly, one object of the present invention is to provide a novel and improved miniature reciprocal microwave phase shifter exhibiting negative phase shift characteristics.

Briefly, the present invention provides an electromagnetic wave apparatus or phase shifter comprising a wave guide structure having a longitudinal axis and at least first and second parallel elongated conductive members. The wave guide structure is dimensioned so as to support propagation of electromagnetic wave energy in a direction along the longitudinal axis of the wave guide structure. The wave energy as supported in the wave guide structure has longitudinally and transversely extending r.f. magnetic field components; the longitudinal component being in the center and the transverse component on the sides. An elongated body of gyromagnetic material is disposed between the conductive members so as to be traversed by the traversely extending magnetic field components. Means, such as a solenoid, is associated with the wave guide structure for establishing a given state of magnetization within the gyromagnetic material and longitudinally thereof so as to effect a predetermined negative phase shift in the electromagnetic wave energy propagated through the wave guide structure.

Such a phase shifter can be utilized in a number of applications such as antenna scanning in airborne phased arrays. Such applications, however, impose severe limitations as to physical size. Therefore, in accordance with another aspect of the invention, an embodiment of the invention is described in which a phase shifter exhibiting negative phase shift characteristics is provided for use in a half wavelength spaced airborne array.

It is, therefore, another object of the present invention to provide a phase shifter more suitable for use in a half wavelength spaced airborne array.

It may be pointed out that when a ferrite material is magnetized in the presence of microwave energy, heat is developed in the ferrite and this results in a change of permeability. Since the propagation constant is a function of permeability, changes in temperature alter the propagation constant and thereby change the degree of phase shift of propagated energy with other variables held constant. In accordance with another aspect of the present invention, heat generated by losses in the ferrite is easily dissipated in that the heat has an extremely short conduction path to the metal guide walls due to its thin construction and the fact that the ferrite is in thermal contact with the broad walls of the wave guide section. Suitable heat sink elements may also be advantageously provided to reduce overall temperature rise in the device. Such an expedient is utilized in still another embodiment of the present invention. In accordance with these latter features of the present invention, it will be understood that the phase shifters provided by the invention are suitable for use in applications in which high average power handling capabilities are required.

Accordingly, it is still another object of the present invention to provide a phase shifter having temperature compensation means and high average power handling capabilities.

The invention itself, however, both as to its organization and method of operation, as well as additional objects and advantages will best be understood from the following description when considered in connection with the accompanying drawings.

BRIEF DESCRIPTION OF THE DRAWINGS

FIG. 3 is a diagrammatic view illustrating magnetic and electric field vectors within the phase shifter, as viewed in a transverse plane perpendicular to the direction of propagation of the wave. The circled X in the figure designates the direct current magnetic field as being into the paper or stated another way, that the magnetic field established by the solenoid is in a direction along the axis of propagation of the wave energy;

DESCRIPTION OF THE PREFERRED EMBODIMENTS

Figure 1:
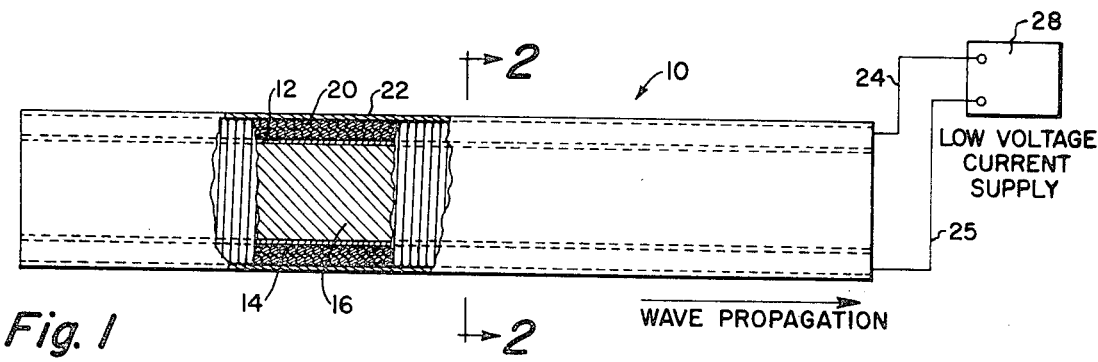
FIG. 1 is a schematic side elevational view, partly in section, of a phase shifter in accordance with the present invention.
Figure 2:
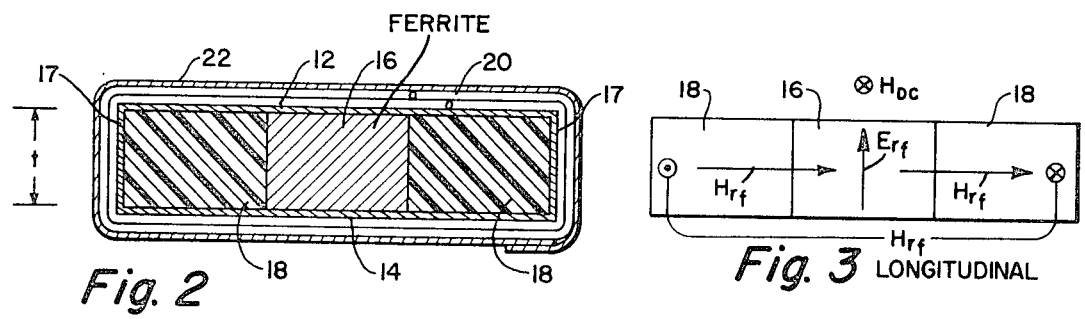
FIG. 2 is a cross-sectional view of the phase shifter of FIG. 1 taken along the line II—II of FIG. 1.

The illustrative embodiment of the invention shown in FIG. 1 comprises a conductively bounded electrical transmission line in the form of a hollow section of rectangular microwave guide 10 having a longitudinal axis and of such dimension so as to be supportive of traveling electromagnetic waves propagating in a direction along the longitudinal axis of the guide 10. The electromagnetic wave energy as supported in the wave guide structure 10 desirably has longitudinally and transversely extending magnetic field components and the wave propagates in a direction along the longitudinal axis of the guide 10 parallel with and between the upper and lower broad side walls 12 and 14, respectively, of the guide 10. This movement of the wave is shown in FIG. 1 by the arrow denoted "wave propagation."

The guide structure 10 is provided with a phase shifter element comprising an elongated body 16 of gyromagnetic material, such as ferrite having a permeability that is variable with variations of an applied magnetic field. The body 16 of ferrite is mounted centrally of the guide 10 between the conductive broad side wall members 12 and 14 and along the longitudinal axis of the guide 10 so as to be traversed by the transversely extending magnetic field components of the wave as is shown in FIG. 3.

The ferrite body is equally spaced from both narrow walls 17 of the guide structure 10 and disposed one on either side of the ferrite body 16 are elongated bodies 18 of non-magnetic dielectric material, such as Teflon, which fill the guide 10 and provide loading in the guide and space for the axial magnetic field region in the guide. The axial extending magnetic field components of the wave, concentrated in the sides of the guide near the narrow walls, do not contribute to effecting phase shift and therefore they need not be in the ferrite element 16, centrally located.

A solenoid 20 is wound about the wave guide 10 for establishing a given state of magnetization within ferrite body 16 in a direction along the axis of the guide 10 to produce a given phase shift in the microwave energy propagated through the wave guide. The direction of magnetization is illustrated in FIG. 3 by the circled X designated $H_{DC}$.

Magnetic shielding for the phase shifter is provided by a thin layer 22 of magnetic iron sheeting suitably secured about the solenoid 20.

With the leads 24 and 25 of the solenoid connected to a source of current 28, a flow of current through the solenoid establishes the magnetic field axially within the guide and through the ferrite. This magnetic field establishes the effective microwave permeability of the ferrite body at a certain value and therefore sets the propagation constant of the wave guide so that microwave energy as propagated through the guide has a difference in phase between the respective ends of the phase shifter. Because the body 16 of ferrite is centered in the guide structure 10 along the plane of maximum electric field and the transverse magnetic field components are perpendicular to the applied magnetic field in the ferrite (as shown in FIG. 3), energy which is propagated in either direction through the phase shifter is similarly shifted in phase. That is to say, the phase shifter of the present invention is reciprocal in operation.

In accordance with the invention, the phase shifter as described will exhibit negative phase shift when the ferrite is thin in the transverse plane compared to a quarter wavelength of the propagating microwave energy.

As a specific example, applicant has achieved negative phase shift with MgMn ferrites at X-band frequencies for a section of wave guide as above described which was 1.5 inches long and where the ferrite body thickness $t$ in the transverse plane varied from 0.020 up to 0.180 inch. A width of 0.25 inch for the ferrite was found to be about optimum for phase shift. With ferrite body thickness in the transverse plane thicker than 0.180 inch, the phase shifter in such a wave guide was positive. Due to the dielectric loading by the ferrite body 16 and Teflon bodies 18 the dimensions of the broad guide walls 12 and 14 were substantially equal to one-half wavelength of the wave energy propagated through the phase shifter. A ferrite loaded wave guide section as described approximately one-half wavelength wide and with a thickness less than one-quarter wavelength can propagate wave energy in the $TE_{10}$ mode, wherein the plane of the magnetic field is parallel to the broad side walls and such a guide section will produce negative phase shift in the propagating wave.

A special feature of the phase shifter as above described is that is has very short thermal paths from the center of the ferrite to the broad side walls and as the ferrite body 16 is mounted in thermal contact with the broad walls, there is thereby provided a suitable heat sink to dissipate heat developed in the ferrite body. Calculations show that for an X-band device with a 1-db. insertion loss the phase shift change due to internal heating of the ferrite would be about 1 percent per 100 watts of CW input power. Experimental results indicate that one can achieve 360° negative phase shift at 9.5 GHz in a 1.5 inch long device within a 1-db. insertion loss figure and most of this loss can be attributed to conductive losses in the guide walls. With appropriate heat sinking, overall temperature rise at the center of the device can be held to about 10° C. per 100 watts input.

Figure 4:
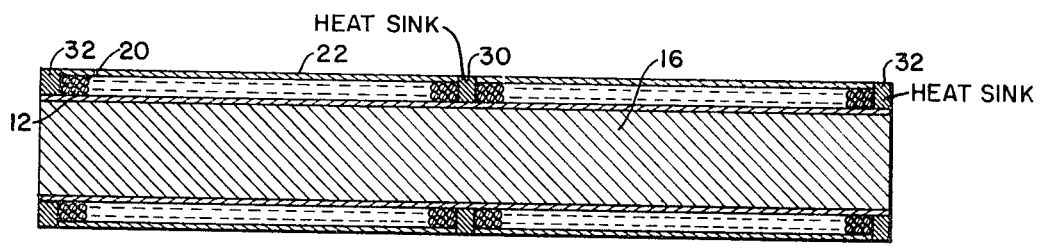
FIG. 4 is a longitudinal sectional view of a modified form of the invention.
Figure 5:
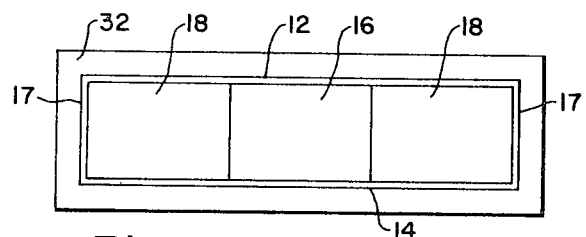
FIG. 5 is an end view of FIG. 4.

In FIGS. 4 and 5, a phase shifter is shown provided with heat sinks. When compared to that shown in FIG. 1, the phase shifter of FIGS. 4 and 5 can be seen to differ therefrom only in being provided with a centrally located heat sink 30 and end located heat sinks 32. The end located heat sinks 32 also provide means for effecting connections to other wave guides.

Thus, it can be seen that the electrically thin loaded guide of the present invention provides a practical phase shifter capable of handling high average power. The physical size of the phase shifter of the present invention is reduced over previously known devices of this type and therefore satisfies a major requirement for airborne applications in electronically scanned antenna systems.

The above-described phase shifter is thin and wide. Due to the dielectric constant of the ferrite and teflon, the width of the guide structure 10 is about one-half wavelength and with the addition of the solenoid 20 the width of the phase shifter is greater than one-half wavelength. Such a geometry requires the phase shifter to be canted when put into a half wavelength spaced antenna array. In FIG. 6C, a phase shifter is illustrated which is more nearly square in cross section and less than one-half wavelength wide when provided with a solenoid. Such a construction is more desirable because it permits the necessary spacing between radiating elements, such as dipole antenna elements, in a one-half wavelength two-axis scan antenna array without the need of canting the phase shifters in the array.

Figure 6A:
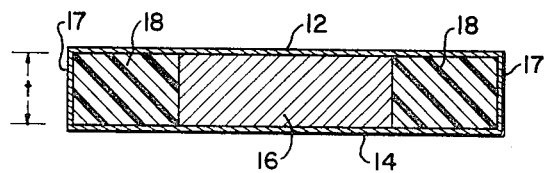
FIGS. 6A, 6B and 6C illustrate the evolutionary steps in developing still another embodiment of the present invention with the final design being shown in FIG. 6C in end elevation.
Figure 6B:
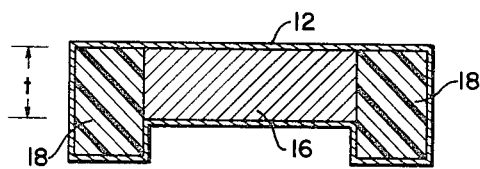
Figure 6C:
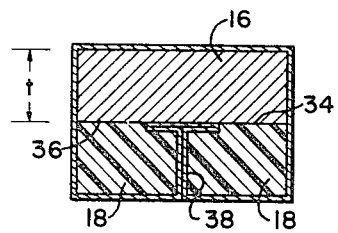

Following the evolutionary steps in developing the phase shifter as shown in FIG. 6C, the phase shifter as shown in FIG. 6A is similar to that shown in FIG. 1 with the ferrite element 16 being centrally located in the guide structure 10 and with the non-magnetic dielectric elements 18 disposed horizontally one on either side of the ferrite body 16. In FIG. 6B, the elements 18 have been moved from their horizontal position and have been placed vertically on either side of the ferrite body 16. In FIG. 6C, the elements 18 have been finally positioned under the ferrite body 16. Portions of the guide walls between the ferrite body 16 and the elements 18 are shown removed as at 34 and 36. In the actual fabrication of the phase shifter as shown in FIG. 6C, the longitudinally extending T-shaped portion 38 could result with the use of evaporated coatings on bodies 16 and 18 and the outer guide walls could be fabricated of a section of wave guide, or the guide walls could be formed by depositing copper or other conductive material on the preformed assembly of the ferrite body and the elements 18 by vacuum evaporation, sputtering or other suitable methods. This latter expedient of forming the outer conductive side walls of the phase shifter could also be used in the embodiments of the invention shown in FIGS. 1–5.

Figure 6D:
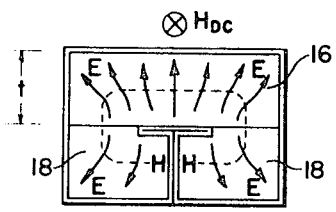
FIG. 6D is a schematic view illustrating magnetic and electric fields within the phase shifter, as viewed in a transverse plane perpendicular to the direction of propagation of the wave, in the wrapped $TE_{10}$ mode.
Figure 6E:
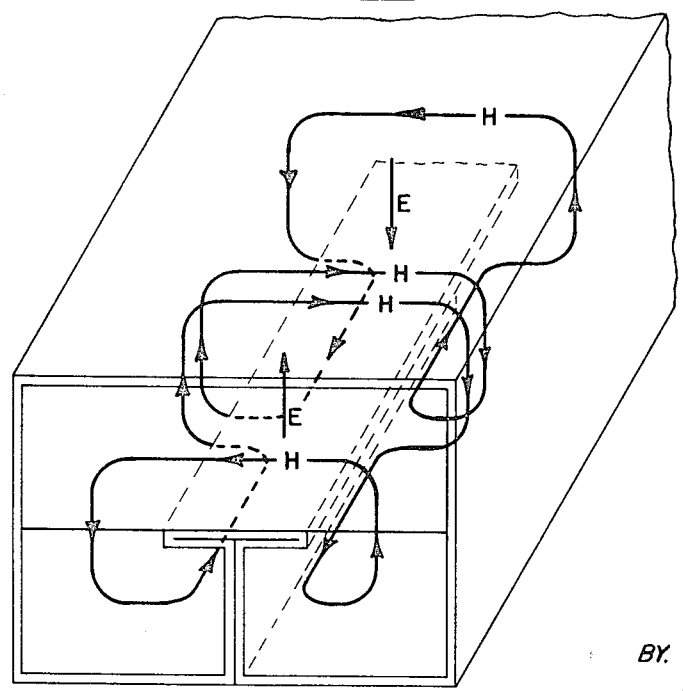
FIG. 6E is a schematic perspective view of the fields in the wrapped $TE_{10}$ mode.

The phase shifter as shown in FIG. 6C has such dimensions as to propagate an electromagnetic wave in what may be considered to be and defined herein as the "wrapped" $TE_{10}$ mode in that the final geometry of the phase shifter as shown in FIG. 6C can be considered to have evolved by "wrapping" the elements 18 of FIG. 6C down to the position shown in FIG. 6B and then under to the position shown in FIG. 6C. FIG. 6E is a schematic perspective view of the E and H fields in the wrapped $TE_{10}$ mode and FIG. 6D is a schematic view illustrating the magnetic and electric fields within the phase shifter, as viewed in transverse plane perpendicular to the direction of propagation of the wave, in the wrapped $TE_{10}$ mode. It can be seen from FIGS. 6D and 6E, that even though the E and H fields are bent in the transverse plane, they are still, in the ferrite, substantially perpendicular to the applied direct current magnetic field, the necessary condition for reciprocal phase shift.

As in the embodiments of the invention shown in FIGS. 1–5, the phase shifter shown in FIGS. 6A–6E will exhibit negative phase shift when the ferrite thickness $t$ in the transverse plane is thin compared to a quarter wavelength of the propagating microwave energy.

The electrically thin ferrite loaded wave guide phase shifters according to the present invention have important advantages over strip line or microstrip phase shifters which exhibit negative phase shift characteristics. One is that in eliminating the center conductor in these versions, the insertion loss is reduced by approximately 0.7, while still maintaining an acceptable value of characteristic impedance of 50–100 ohms. Another is that the thermal paths from the ferrite to the wave guide wall are very short thereby making the device capable of handling large amounts of average power.

While the salient features of the invention have been described in detail with respect to several embodiments, it will be readily apparent that numerous modifications may be made within the spirit and scope of the invention and it is, therefore, not desired to limit the invention to the exact details shown except insofar as they may be set forth in the following claims.

I claim:

1. A reciprocal phase shifter apparatus comprising a section of wave guide having a longitudinal axis and pairs of parallel broad and narrow conductive wall members, a body of gyromagnetic material disposed within said section of wave guide adjacent one of the broad wall members thereof, a pair of non-magnetic dielectric elements interposed between said body of gyromagnetic material and the other one of the broad wall members, said other one of the broad wall members including an inwardly protruding longitudinally extending T-shaped portion disposed adjacent said gyromagnetic material and separating said elements, said section of wave guide supportive of traveling electromagnetic wave energy propagating in the direction of said longitudinal axis, said electromagnetic wave energy as supported in said section of wave guide being of an electrical length λ and having longitudinally and transversely extending magnetic field components, said body of gyromagnetic material having an electrical thickness in the transverse plane of the guide and in the direction of incident wave electric field which is substantially less than one-quarter λ and being traversed by said transversely extending magnetic field components, and means for establishing a given state of magnetization longitudinally of and within said body of gyromagnetic material so as to effect a predetermined negative phase shift in said electromagnetic wave energy propagated through said section of rectangular wave guide.

2. A reciprocal phase shifter apparatus as defined in claim 1 wherein the electromagnetic wave energy propagating within said section of wave guide is in the wrapped $TE_{10}$ mode.

3. An electromagnetic wave apparatus comprising a wave guide structure having a longitudinal axis and at least first and second parallel elongated conductive members, said wave guide structure being dimensioned so as to support propagation of electromagnetic wave energy in a direction along the longitudinal axis of said wave guide structure, said electromagnetic wave energy as supported in said wave guide structure having longitudinally and transversely extending magnetic field components, an elongated body of gyromagnetic material disposed between said conductive members so as to be traversed by said transversely extending magnetic field components, a pair of elongated elements of non-magnetic dielectric material, each of said elements being disposed between said conductive members with one being positioned on either side of said gyromagnetic material, means associated with said wave guide structure for establishing a given state of magnetization within said body and longitudinally thereof, said electromagnetic wave energy as supported in said wave guide structure being of electrical wavelength λ and said gyromagnetic material being disposed within said wave guide structure along the longitudinal axis thereof and of an electrical thickness in the transverse plane of the guide and in the direction of incident wave electric field which is substantially less than one-quarter λ whereby to produce negative phase shift in said electromagnetic wave energy propagated through said wave guide structure.

4. An electromagnetic wave apparatus comprising a wave guide structure having a longitudinal axis and at least first and second parallel elongated conductive members, said wave guide structure being dimensioned so as to support propagation of electromagnetic wave energy in a direction along the longitudinal axis of said wave guide structure, said electromagnetic wave energy as supported in said wave guide structure having longitudinally and transversely extending magnetic field components, an elongated body of gyromagnetic material disposed between said conductive members so as to be traversed by said transversely extending magnetic field components, means associated with said wave guide structure for establishing a given state of magnetization within said body and longitudinally thereof, said gyromagnetic material being disposed within said wave guide structure between said conductive members and adjacent one of them, and a pair of elongated elements of non-magnetic dielectric material disposed between said gyromagnetic material and the other one of said conductive members, said other one of said conductive members having an inwardly protruding longitudinally extending T-shaped portion disposed adjacent said gyromagnetic material and separating said pair of elongated elements of non-magnetic dielectric material.

5. An electromagnetic wave apparatus as defined in claim 4 wherein the electromagnetic wave energy propagating within said wave guide structure is in the wrapped $TE_{10}$ mode.

6. An electromagnetic wave apparatus comprising a wave guide structure having a longitudinal axis and at least first and second parallel elongated conductive members, said second parallel elongated conductive member including an inwardly protruding longitudinally extending T-shaped portion having a part connected to said second conductive member and perpendicular thereto and a part parallel to said second conductive member and connected to the end of said first part opposite its connection to said second conductive member, said wave guide structure being dimensioned so as to support propagation of electromagnetic wave energy in a direction along the longitudinal axis of said wave guide structure, said electromagnetic wave energy as supported in said wave guide structure having longitudinally and transversely extending magnetic field components, an elongated body of gyromagnetic material disposed between said conductive members so as to be traversed by said transversely extending magnetic field components, a pair of elongated elements of non-magnetic dielectric material, the parallel part of said T-shaped portion disposed adjacent said gyromagnetic material, the perpendicular part of said T-shaped portion separating said pair of elongated elements, means associated with said wave guide structure for establishing a given state of magnetization within said body and longitudinally thereof, said electromagnetic wave energy as supported in said wave guide structure being of electrical wavelength $\lambda$, said gyromagnetic material being disposed within said wave guide structure along the longitudinal axis thereof and of an electrical thickness in the transverse plane of the guide and in the direction of incident wave electric field which is substantially less than one-quarter $\lambda$ whereby negative phase shift in said electromagnetic wave energy propagated through the wave guide structure is obtained.

\* \* \* \* \*